(12) United States Patent
Coffin et al.

(10) Patent No.: US 9,854,740 B2
(45) Date of Patent: Jan. 2, 2018

(54) REEL MOWER WITH REEL CUTTING UNITS HAVING GRASS COLLECTING BASKETS WITH DEFLECTABLE BOTTOM PORTIONS RESPONSIVE TO MOVEMENT OF THE CUTTING UNITS

(71) Applicant: The Toro Company, Bloomington, MN (US)

(72) Inventors: Scott M. Coffin, Plymouth, MN (US); Dennis J. Berndt, Eagan, MN (US)

(73) Assignee: The Toro Company, Bloomington, MN (US)

( * ) Notice: Subject to any disclaimer, the term of this patent is extended or adjusted under 35 U.S.C. 154(b) by 183 days.

(21) Appl. No.: 14/752,885

(22) Filed: Jun. 27, 2015

(65) Prior Publication Data
US 2016/0374268 A1  Dec. 29, 2016

(51) Int. Cl.
*A01D 43/063* (2006.01)
*A01D 34/44* (2006.01)

(52) U.S. Cl.
CPC .......... *A01D 43/0638* (2013.01); *A01D 34/44* (2013.01)

(58) Field of Classification Search
CPC ...... A01D 34/125; A01D 34/44; A01D 34/49; A01D 34/53; A01D 34/71; A01D 42/005; A01D 42/02; A01D 42/06; A01D 43/06–43/0638
See application file for complete search history.

(56) References Cited

U.S. PATENT DOCUMENTS

| | | | |
|---|---|---|---|
| 1,999,102 A | 4/1935 | Kirby | |
| 2,440,934 A | 5/1948 | DeVol | |
| 2,579,103 A * | 12/1951 | Whittaker | A01D 43/063 56/200 |
| 2,668,411 A * | 2/1954 | Kircher, Jr. | A01D 43/063 56/199 |
| 2,670,587 A * | 3/1954 | Larrowe | A01D 43/063 15/79.1 |
| 2,712,720 A * | 7/1955 | Kircher, Jr. | A01D 43/063 56/199 |
| 3,129,550 A * | 4/1964 | Waag | A01D 43/063 56/199 |
| 3,423,916 A * | 1/1969 | Teal | A01D 43/063 56/199 |
| 3,430,422 A | 3/1969 | Dalton | |
| 3,691,740 A * | 9/1972 | Weber | A01D 43/063 56/198 |

(Continued)

*Primary Examiner* — Robert E Pezzuto
*Assistant Examiner* — Adam J Behrens
(74) *Attorney, Agent, or Firm* — James W. Miller

(57) ABSTRACT

A reel mower has a traction frame which carries one or more reel cutting units. Each cutting unit has a grass basket associated therewith for receiving and collecting grass clippings generated by operation of the cutting unit. Each grass basket has a forward portion of a bottom wall thereof formed by a piece of flexible material. An actuator is operatively engaged with the flexible material piece for lifting a front end of the flexible material piece upwardly relative to a rear end of the flexible material piece in response to changes in orientation between the cutting unit and the grass basket during operation of the mower to incline the flexible material piece and thereby promote the flow of grass clippings down the so inclined flexible material piece to more fully fill the grass basket.

21 Claims, 6 Drawing Sheets

(56) References Cited

U.S. PATENT DOCUMENTS

| | | | | |
|---|---|---|---|---|
| 4,747,258 A * | 5/1988 | Martinez | A01D 43/063 | 56/199 |
| 4,924,663 A * | 5/1990 | Ehn, Jr. | A01D 43/063 | 56/202 |
| 4,970,852 A * | 11/1990 | Check | A01D 43/063 | 56/199 |
| 5,412,931 A * | 5/1995 | Reichen | A01D 43/063 | 56/199 |
| 5,533,326 A * | 7/1996 | Goman | A01D 75/306 | 56/249 |
| 6,237,313 B1 * | 5/2001 | Leden | A01D 34/43 | 56/199 |
| 6,341,478 B1 * | 1/2002 | Sallstrom | A01D 43/063 | 56/199 |
| 7,111,443 B2 | 9/2006 | Anderson et al. | | |
| 7,600,365 B2 * | 10/2009 | Hibi | A01D 43/063 | 56/199 |
| 7,654,070 B2 * | 2/2010 | Miyamoto | A01D 43/0635 | 56/202 |
| 7,765,779 B2 * | 8/2010 | Surridge | A01D 43/063 | 16/258 |
| 7,845,152 B2 * | 12/2010 | Surridge | A01D 43/063 | 56/199 |
| 8,407,976 B2 * | 4/2013 | Percy | A01D 43/063 | 56/199 |
| 8,544,251 B2 * | 10/2013 | Goman | A01D 34/44 | 56/249 |
| 9,027,317 B2 * | 5/2015 | Thier | A01D 43/063 | 56/199 |
| 2003/0182916 A1 * | 10/2003 | Iida | A01D 34/71 | 56/202 |
| 2004/0020180 A1 * | 2/2004 | Osborne | A01D 43/063 | 56/194 |
| 2005/0120697 A1 * | 6/2005 | Percy | A01D 43/063 | 56/202 |
| 2006/0168929 A1 * | 8/2006 | Phillips | A01D 75/306 | 56/7 |
| 2008/0155956 A1 * | 7/2008 | Miyamoto | A01D 43/0635 | 56/203 |
| 2011/0179759 A1 * | 7/2011 | Goman | A01D 34/44 | 56/253 |
| 2014/0059997 A1 * | 3/2014 | Thier | A01D 43/063 | 56/199 |
| 2014/0215994 A1 * | 8/2014 | Thier | A01D 43/063 | 56/199 |

* cited by examiner

REEL MOWER WITH REEL CUTTING UNITS HAVING GRASS COLLECTING BASKETS WITH DEFLECTABLE BOTTOM PORTIONS RESPONSIVE TO MOVEMENT OF THE CUTTING UNITS

TECHNICAL FIELD

This invention relates generally to reel mowers having one or more reel cutting units and, more particularly, to the grass baskets associated with the cutting units for collecting the grass clippings generated by the operation of the cutting units.

BACKGROUND OF THE INVENTION

Reel mowers equipped with reel cutting units are well known for mowing grass on golf courses and the like. For example, a riding fairway mower has a traction frame on which multiple reel cutting units are mounted in a gang configuration for mowing the fairways of golf courses. Each cutting unit typically comprises a rotatable reel that sweeps the grass against a fixed bedknife and front and rear rollers for allowing the cutting unit to roll over the ground. The assignee of this invention, namely The Toro Company, manufactures and sells a line of such reel mowers under the Reelmaster® brand name.

A separate grass basket can be coupled to each cutting unit. Each grass basket is substantially enclosed except for an open mouth. The cutting unit to which such grass basket is mounted throws grass clippings through the open mouth of the grass basket into the interior of the grass basket for collection of the grass clippings within the grass basket during operation of the mower. When the grass baskets on the cutting units become filled, the operator must stop the mower, lift the baskets off the cutting units, empty the baskets, and then replace the baskets on the cutting units before mowing can resume. Preferably, this basket emptying operation has to be conducted at a location where the clippings can be appropriately dumped which may require the operator to first drive the mower to such location. Alternatively, a utility vehicle has to be brought up to or follow the mower so that the operator can dump the clippings into the box of the utility vehicle to thereafter use the utility vehicle to haul the clippings off.

The grass basket and the cutting unit to which it is coupled, while being operatively coupled to each other during operation of the mower, are able to pivot relative to one another during operation of the mower about a horizontal pivot axis defined by a pair of mounting pins on the grass basket that are received in a pair of slots on the cutting unit. This permits necessary changes in orientation between the grass basket and the cutting unit during operation of the mower without uncoupling the two from one another. For example, when the cutting unit is lifted off the ground into a transport position using a lift and lower system on the mower, the grass basket lifts with it. However, the cutting unit becomes rearwardly inclined relative to the grass basket in a nose up/tail down orientation relative to the grass basket as it reaches the transport position with the front roller of the cutting unit lifting upwardly towards the bottom wall of the grass basket. Such a change in orientation can also occur during a cutting operation of the mower when the mower is being used on contoured or rolling surfaces, such as when the cutting unit comes to the crest of a hill or as the cutting unit transitions through a dip or swale in the surface.

It has been common in the reel mower art in recent times to use grass baskets that are molded out of a substantially rigid plastic material and to shape the grass basket to permit the usual changes in orientation between the grass basket and the cutting unit that occur during operation of the mower, namely either when the mower is in its cutting or transport modes. More particularly, the bottom wall of known prior art grass baskets has been formed with a curved, upwardly raised portion leading extending across the width of the bottom wall near the front end of the bottom wall. This curved raised portion raises the front end of the bottom wall of the grass basket with respect to the remaining portion of the bottom wall. However, the raised portion of the bottom wall provides a space into which the front roller can swing without hitting the grass basket during the orientation changes that occur between the grass basket and the cutting unit during the operation of the mower. This space must be large enough to take into account that the front roller in certain configurations must be spaced significantly forwardly of the reel to be able to accommodate an optional turf groomer that can be installed between the front roller and the reel. This is useful in avoiding damage over time to the grass basket or the front roller and to mitigate the risk that contact between the front roller and the grass basket could inadvertently uncouple the grass basket from the cutting unit.

Unfortunately, the raised portion of the bottom wall, which must necessarily be designed to provide space for the front roller in the worst case scenario of the most forward position of the front roller on the cutting unit, constricts the vertical size of the open mouth of the grass basket. In addition, it has been necessary to reinforce the bottom wall where the raised portion of the bottom wall transitions into the front end of the bottom wall. This reinforcement structure creates an upwardly extending lip along the bottom wall of the grass basket very near to but behind the front lip of the bottom wall. The Applicants have discovered that grass clippings tend to accumulate on this lip and quickly build up thereon, particularly when cutting damp or wet grass. This soon impedes or blocks the flow of the clippings further back into the interior of the grass basket. As a result, the Applicants discovered that the grass basket will stop freely accepting the flow of clippings with the clippings even being forced partially outside the grass basket into unsightly piles on the surface being mowed due to the blockages at the mouth and even though the grass basket is only partially filled with empty space remaining near the rear end of the grass basket.

As a result of the partial filling of the grass baskets that sometimes occur as described above, the operator of the reel mower must stop more frequently than would be desired to empty the partially filled grass baskets, thus removing the blockages in the open mouths of the grass baskets that built up and impeded their more complete filling. This is not productive and requires more time to finish the mowing operation than is strictly necessary. Accordingly, it would be an advance in the art to provide a solution to this problem in allowing the grass basket to fill substantially completely but while still permitting the necessary changes in orientation that occur between the grass basket and the cutting unit during operation of the mower.

SUMMARY OF THE INVENTION

One aspect of this invention relates to a reel mower which comprises a traction frame. A reel cutting unit is operatively coupled to the traction frame. A grass catcher is operatively coupled to the cutting unit such that an open mouth of the grass catcher receives grass clippings from the cutting unit. The grass catcher has a deflectable portion that is moved by an actuator carried on the cutting unit from a non-deflected orientation into a deflected orientation in which the deflectable portion assists the movement of grass clippings further into an interior of the grass catcher away from the open mouth of the grass catcher to enable more complete filling of the grass catcher with grass clippings. The actuator is configured to automatically apply an actuating force to the deflectable portion to move the deflectable portion into the deflected orientation in response to changes in orientation between the grass catcher and the cutting unit occurring during operation of the mower.

Another aspect of this invention relates to a reel mower which comprises a traction frame which carries one or more reel cutting units. A grass basket is associated with each cutting unit for receiving and collecting grass clippings generated by operation of the cutting unit. Each grass basket has at least a forward portion of a bottom wall thereof formed by a sheet of flexible material. An actuator is operatively engaged with the flexible material sheet for elevating a front end of the flexible material sheet relative to a rear end of the flexible material sheet in response to changes in orientation between the cutting unit and the grass basket during operation of the mower to thereby incline the flexible material sheet to promote the flow of grass clippings down the inclined flexible material piece to more fully fill the grass basket.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

Figure 1:
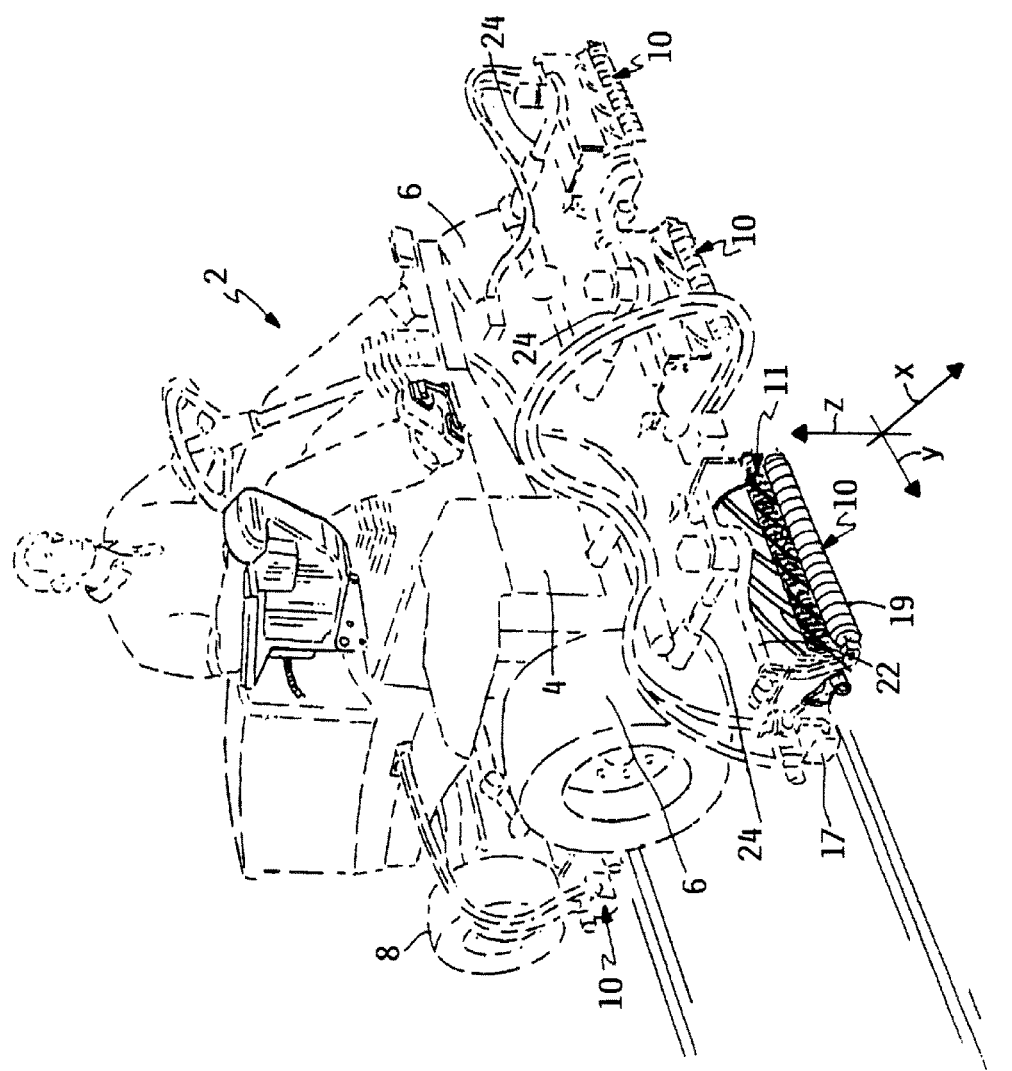
FIG. 1 is a perspective view of one type of reel mower on which the grass basket of this invention can be used, particularly illustrating the reel mower carrying a plurality of reel cutting units arranged in a gang configuration.

Referring to FIG. 1, one embodiment of a reel mower 2 according to this invention includes a traction frame 4 that is movably supported on the ground by various front wheels 6 and rear wheels 8. As depicted herein, mower 2 comprises a self-propelled riding fairway mower that is operated by an operator who sits on a seat carried on traction frame 4. Three laterally spaced apart front reel cutting units 10 extend forwardly from traction frame 4 and are located in advance of front wheels 6 of mower 2. Two similar laterally spaced rear cutting units 10 (one of which can be partially seen in FIG. 1) are carried beneath traction frame 4 in a 3-2 gang configuration to overlap the gaps between front cutting units 10. Thus, all five cutting units 10 collectively cut a single, wide, unbroken swath of grass during each pass of mower 2 across a turf surface.

Front wheels 6 are driven by the engine or motor of mower 2 to propel traction frame 4, and hence cutting units 10, over the ground. Rear wheels 8 are steerable to allow the operator to turn or steer mower 2 using an input from a steering wheel 9. Mower 2 as shown herein is typical of the line of reel mowers that are manufactured and sold by The Toro Company, the assignee of this invention, under the Reelmaster® brand name.

The number of cutting units 10 carried on traction frame 4 can be greater or fewer than the number shown in FIG. 1. For example, there may be three cutting units 10 arranged in a 2-1 triplex configuration. Alternatively, seven cutting units 10 can be arranged in either a 4-3 or 3-4 gang configuration for cutting even a wider swath of grass than the five cutting units 10 shown in FIG. 1. In addition, in an embodiment of reel mower 2 comprising a walk behind reel mower, there may be only a single cutting unit 10 carried on the traction frame of the walk behind mower.

Figure 5:
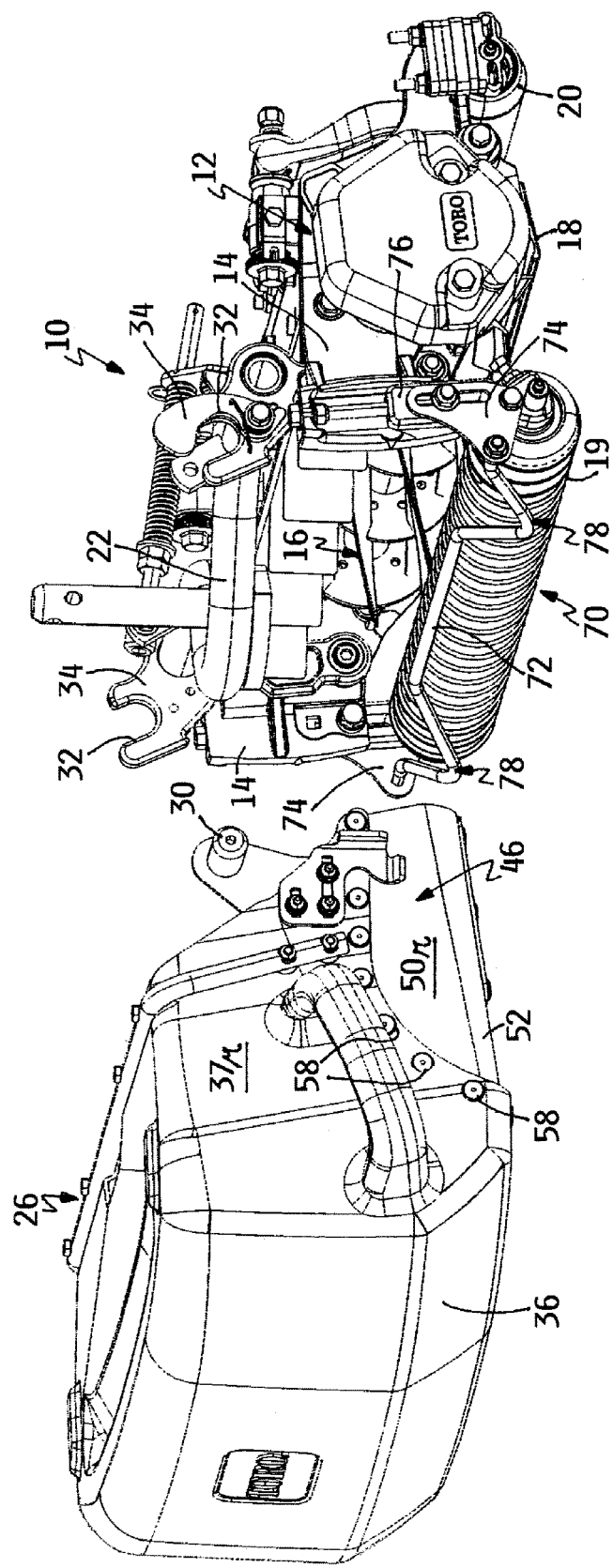
FIG. 5 is a perspective view of the grass basket of FIG. 3 shown exploded away from a reel cutting unit of the type shown in FIG. 1, the reel cutting unit shown carrying a first embodiment of an actuator for pushing upwardly on the deflectable portion of the bottom wall of the grass basket in response to changes in orientation between the cutting unit and the grass basket during operation of the mower to move the deflectable portion into an inclined, deflected orientation that is conducive to more fully filling the grass basket with grass clippings.

Referring now to FIG. 5, each reel cutting unit 10 includes a cutting unit frame 12 defined by spaced side plates 14 that are united or joined by various cross members. A rotatable reel 16 and fixed bedknife 18 are carried between side plates 14 with reel 16 serving to sweep standing grass against a sharpened cutting edge on bedknife 18 to cut the grass. Cutting unit 10 includes front and rear support rollers 19 and 20 which permit cutting unit 10 to be self-supporting on the ground and to roll over the ground as mower 2 travels over the ground. As shown in FIG. 1, reel 16 is rotated by a hydraulic motor 17 mounted on one of the side plates and operated by any conventional hydraulic system carried on traction frame 4, though reel 16 could also be powered by an electric motor or a mechanical drive system or the like. Each cutting unit 10 can optionally be equipped with a conventional turf groomer 11 with one such groomer 11 being illustrated in place on one cutting unit 10 in FIG. 1 between front roller 19 and reel 16.

Preferably, each cutting unit 10 is free to move relative to the ground about three axes of movement during grass cutting operation of mower 2. More specifically, cutting unit 10 can roll side-to-side about a horizontal longitudinal axis x, can pitch fore-and-aft about a horizontal transverse axis y, and can yaw about a vertical axis z. The xyz axes are depicted in FIG. 1. Movement of cutting unit 10 about the x and y axes allows cutting unit 10 to float relative to the ground to follow the contours of the surface it is cutting. Movement about the z axis allows cutting unit 10 to steer or turn itself during turns of mower 2.

The structure that permits such three dimensional movement of each cutting unit 10 is part of a carrier frame 22, a portion of which is shown in the drawings, that suspends each cutting unit 10 from a lift arm 24. Lift arms 24 are part of a lift and lower system on mower 2 and serve to lift cutting units 10 from their lowered cutting positions into raised transport positions. Further details of carrier frame 22 and how it connects to lift arm 24 and cutting unit 10 are well known in the art of reel mowers and need not be further described herein. Similarly, the nature and operation of the lift and lower system is also well known in the reel mower art and need not be further described herein.

Cutting unit frame 12 includes an arcuate rear shield behind reel 16 that leads to a top wall 25 overlying reel 16. As reel 16 rotates in a direction to push the standing grass against bedknife 18 to cut the grass, the grass clippings so generated by the cutting operation will be circulated by the rear shield up and around the back of reel 16 to be discharged forwardly from reel 16 beneath top wall 25 in the forward direction indicated by the arrow A in FIG. 6. A grass basket 26 is located in advance of cutting unit 10 to catch and retain these grass clippings therein.

Mower 2 as discussed thus far is a generally typical gang reel mower known in the prior art. The improvement of this invention relates to an improved basket 26 and a modification to the cutting unit 10 that carries such basket 26 that enhances the ability of basket 26 to fill more fully with grass clippings during operation of mower 2. However, before discussing such improved basket 26 and the accompanying modification to cutting unit 10 of this invention, it would be useful to discuss the prior art basket 26' shown in FIG. 2. This will set the stage for a better understanding of this invention.

Figure 2:
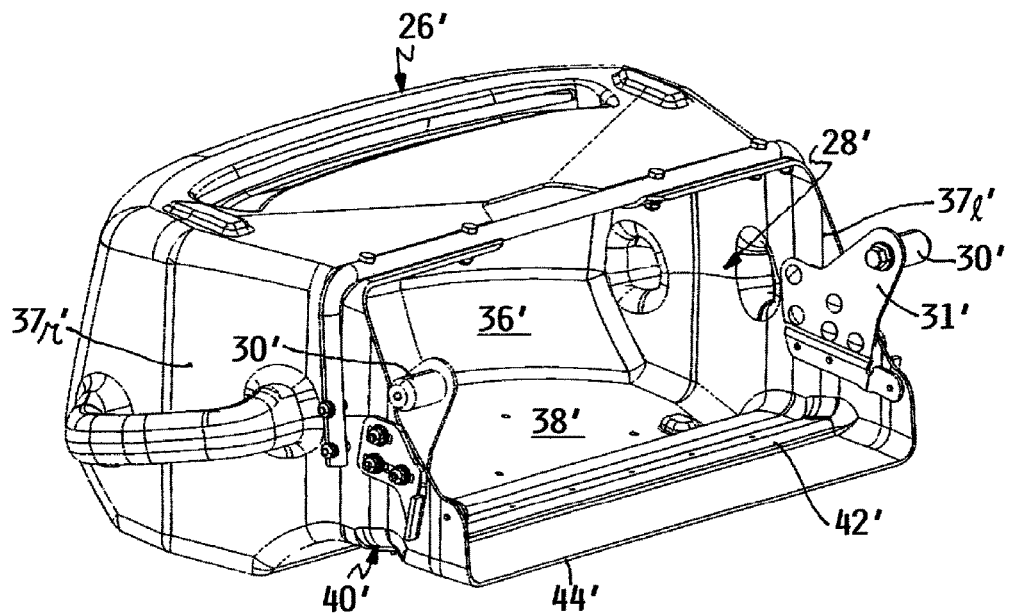
FIG. 2 is a perspective view of a prior art grass basket.

As shown in FIG. 2, prior art basket 26' comprises a substantially enclosed container or receptacle except for an open front mouth 28'. Basket 26' includes two laterally outwardly extending mounting pins 30', one on either side wall of basket 26', which can be slipped into mounting slots 32 on mounting brackets 34 provided on cutting unit frame 12. See FIG. 5. Pins 30' received in slots 32 removably couple basket 26' to cutting unit 10. Grass clippings are thrown from reel 16 through mouth 28' towards a closed rear end 36' of basket 26' to be retained therein. Basket 26' can be periodically removed from cutting unit 10 and dumped to empty basket 26' of its accumulated grass clippings. Once empty, basket 26' can be easily reinstalled on cutting unit 10 by dropping or slipping pins 30' back into mounting slots 32.

Prior art basket' 26 of FIG. 2 for the most part is molded as one piece out of a substantially rigid plastic material except that a few parts, such as mounting pins 30', are made of metal and are carried on metallic flanges 31' that are bolted to left and right side walls $37_l'$ and $37_r'$ of the plastic body of grass basket 26'. More notably, a bottom wall 38' of grass basket 26' is formed with a curved raised portion 40' that requires a reinforcement member 42' to be located in the elevated front end of bottom wall 38' somewhat behind the front lip 44' of bottom wall 38'. This basket construction and geometry gives rise to the partial filling problem discussed the Background of the Invention section of this application. This invention improves the design of basket 26' in conjunction with a modification to cutting unit 10 that effectively solves such problem. Since many of the reference numerals used to describe prior art basket 26' will also apply to the same or corresponding portions of the improved basket of this invention, the same reference numerals will continue to be used where appropriate to describe the basket of this invention except that the prime designation used with respect to the prior art basket 26' will be dropped, i.e. the basket of this invention will be referred to as basket 26 instead of basket 26', etc.

Figure 3:
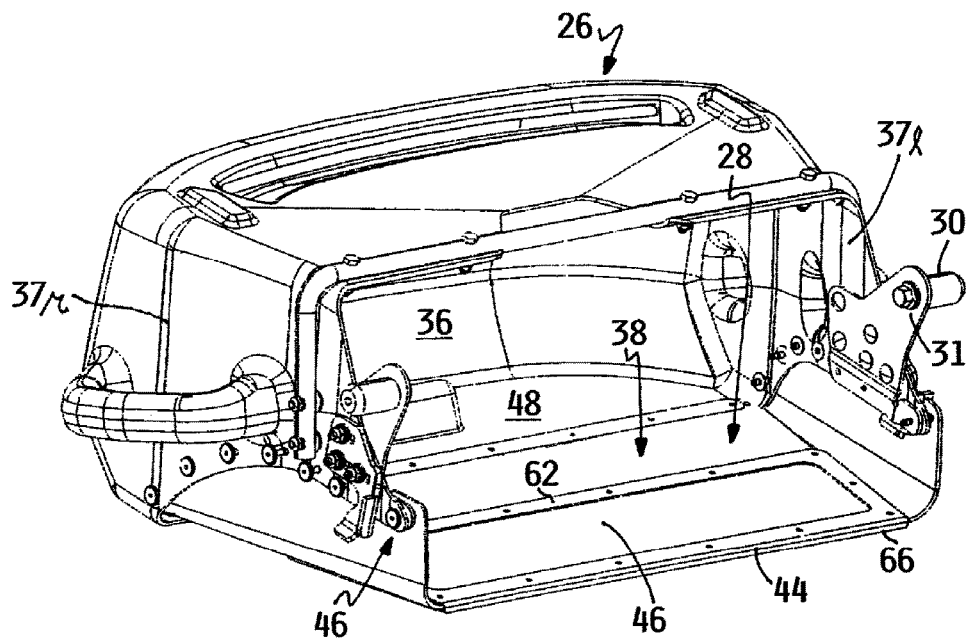
FIG. 3 is a perspective view similar to FIG. 2 but particularly illustrating the grass basket of this invention including the deflectable portion of the bottom wall of the grass basket.
Figure 4:
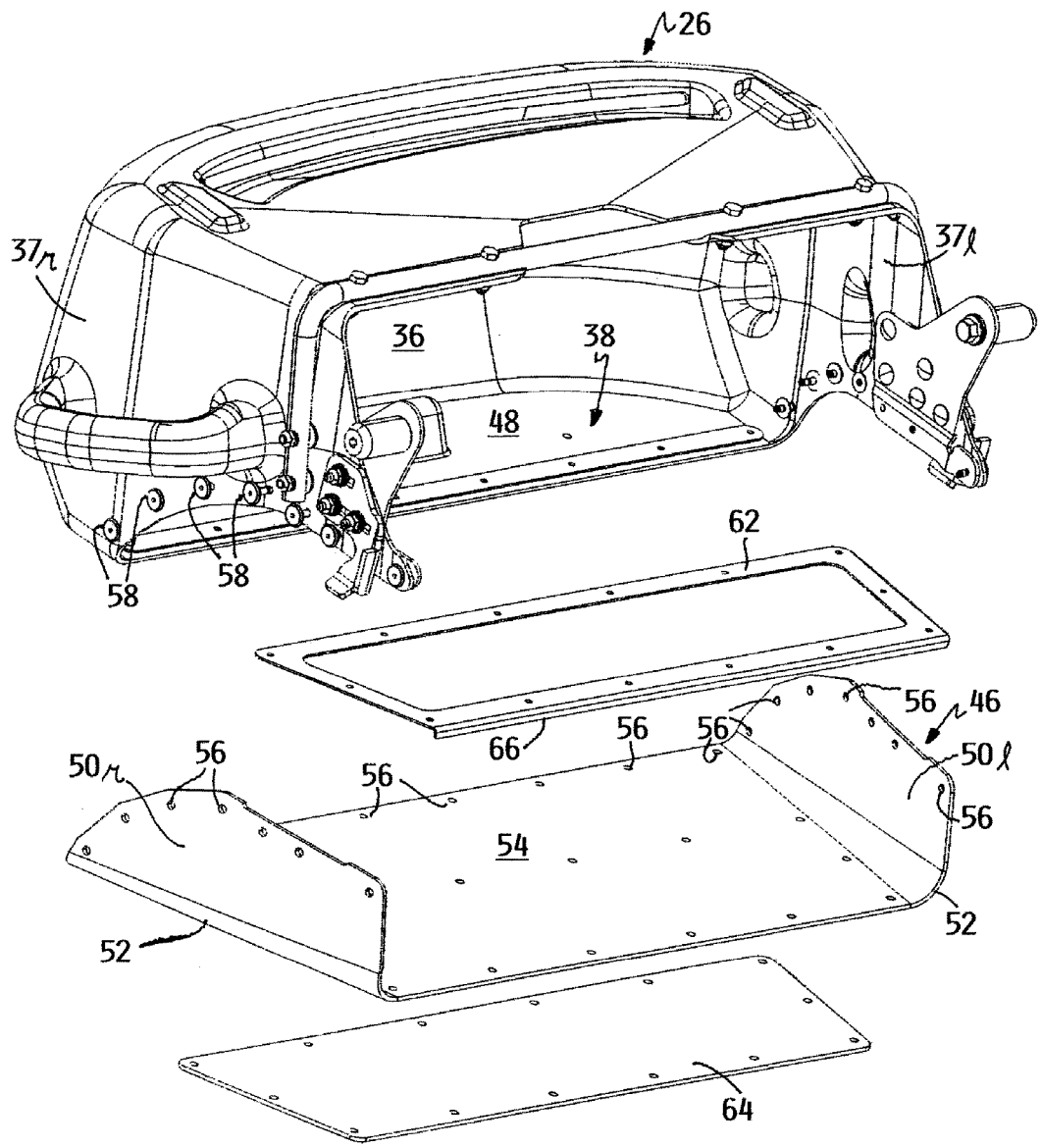
FIG. 4 is an enlarged, exploded perspective view of the grass basket of FIG. 3, particularly illustrating the deflectable portion of the bottom wall of the grass basket and various stiffening members for the deflectable portion exploded away from the remainder of the grass basket and from each other.

Referring now to FIGS. 3-7, basket 26 of this invention is the same size, shape and construction as prior art basket 26' except in a few significant respects. First, bottom wall 38 is no longer at two different vertical levels since curved raised portion 40' of prior art basket 26' has been deleted. Instead, a forward portion of bottom wall 38 and lower portions of each of the left and right side walls $37_l$ and $37_r$ have been cut away as best shown in FIG. 4. Second, a piece 46 of flexible material, such as an elastomeric material made of one or more plies, is used to fill in the cut away portions of bottom wall 38 and side walls $37_l$ and $37_r$. Piece 46 essentially restores basket 26 to the same overall shape and dimensions as basket 26' except that basket 26 now has a bottom wall 38 that is absent raised portion 40' such that bottom wall 38 is generally horizontal all the way from closed rear end 36 of basket 26 to front lip 44 of bottom wall 38. As a result, open mouth 28 of basket 26 is vertically deeper than the open mouth 28' of prior art basket 26' as best shown by comparing FIGS. 2 and 3 to one another. Bottom wall 38 of basket 26 now comprises two pieces, namely piece 46 forming a forward portion of bottom wall 38 and a smaller remaining portion 48 of the original plastic body of basket 26 located between piece 46 and rear end 36 of basket 26.

Referring now to FIG. 4, piece 46 when unassembled in basket 26 normally lies flat. However, piece 46 is sized to be big enough so that it forms a shallow, upwardly facing, generally U-shape when it is assembled in basket 26. This is accomplished by bending up the sides of piece 46 to form upwardly extending left and right side walls $50_l$ and $50_r$ that are joined by arcuate transition sections 52 to opposite sides of a flat, substantially horizontal base 54. The upper ends of side walls $50_l$ and $50_r$ and the free rear end of base 54 have fastener receiving apertures 56. Apertures 56 permit these ends of piece 46 to be secured by suitable fasteners, such as pop rivets 58 some of which are shown in FIGS. 4 and 5, to the lower ends of side walls $37_l$ and $37_r$ and to a forward end of remaining portion 48 of bottom wall 38. FIGS. 3 and 5 illustrate piece 46 as it appears after having been assembled into basket 26. Once so assembled, piece 46 is not designed to be easily removable or replaceable as pop rivets 58 comprise a generally permanent attachment method. However, more easily removable fasteners could be used if so desired.

Referring again to FIG. 4, the portion of piece 46 comprising base 54 is reinforced by a pair of stiffeners including an upper steel stiffener 62 and a lower stiffener 64 made of ultra-high molecular weight (UHMW) plastic. Stiffeners 62 and 64 have identical exterior trapezoidal shapes that mimic the trapezoidal shape of the forward portion of base 54 of piece 46, i.e. the shape of the forward portion of base 54 inside the arcuate transition sections 52. Lower stiffener 64 comprises a solid piece of material while upper stiffener 62 is apertured in the manner of a picture frame. Stiffeners 62 and 64 are riveted in place to the top side and underside of the forward portion of base 54 of piece 56 with the rivets having been removed from FIGS. 3 and 4 for the sake of clarity. Lower stiffener 64 comprises a wear surface as will be described in more detail below.

Upper stiffener 62 includes a downwardly extending lip 66 along its front edge. When so attached, lip 66 of upper stiffener 62 wraps down around the front edge of piece 46 to protect the front edge of piece 46 from damage or wear. In effect, lip 66 of upper stiffener 62 becomes the lower lip 44 of bottom wall 38 of basket 26. However, lip 66 could be dispensed with if so desired.

Figure 6:
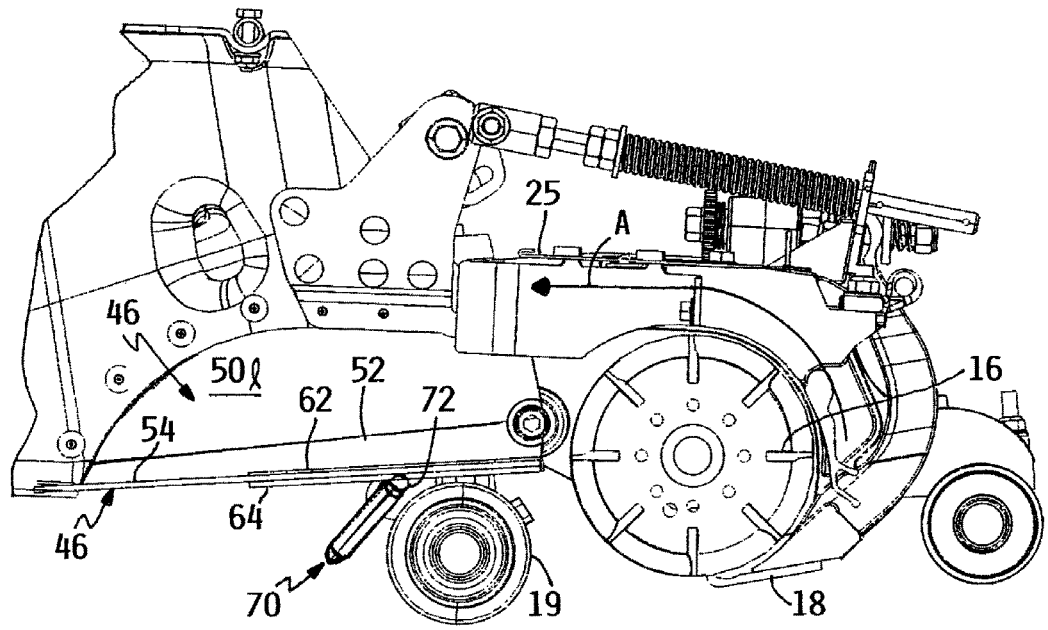
FIG. 6 is a cross-sectional, side elevational view of a reel cutting unit of the type shown in FIG. 1 equipped with the grass basket of FIG. 3, particularly illustrating the deflectable portion of the bottom wall of the grass basket in the non-deflected orientation thereof corresponding to a first orientation of the cutting unit and grass basket relative to one another.

Piece 46 forms a deflectable portion of bottom wall 38 of basket 26 that is movable between a non-deflected orientation and a deflected orientation in which piece 46 is pushed upwardly about its rear edge which is vertically anchored to the remaining portion 48 of bottom wall 38. In this respect, the vertical anchoring of the rear edge of piece 46 acts very much like a pivot or hinge to allow piece 46 to become inclined relative to basket 26 between its front end adjacent lip 66 and its vertically fixed rear end. When so inclined in the deflected orientation thereof, piece 46 slopes downwardly as it extends rearwardly compared to the more generally horizontal orientation that it occupies in its non-deflected orientation as shown in FIG. 6.

Figure 7:
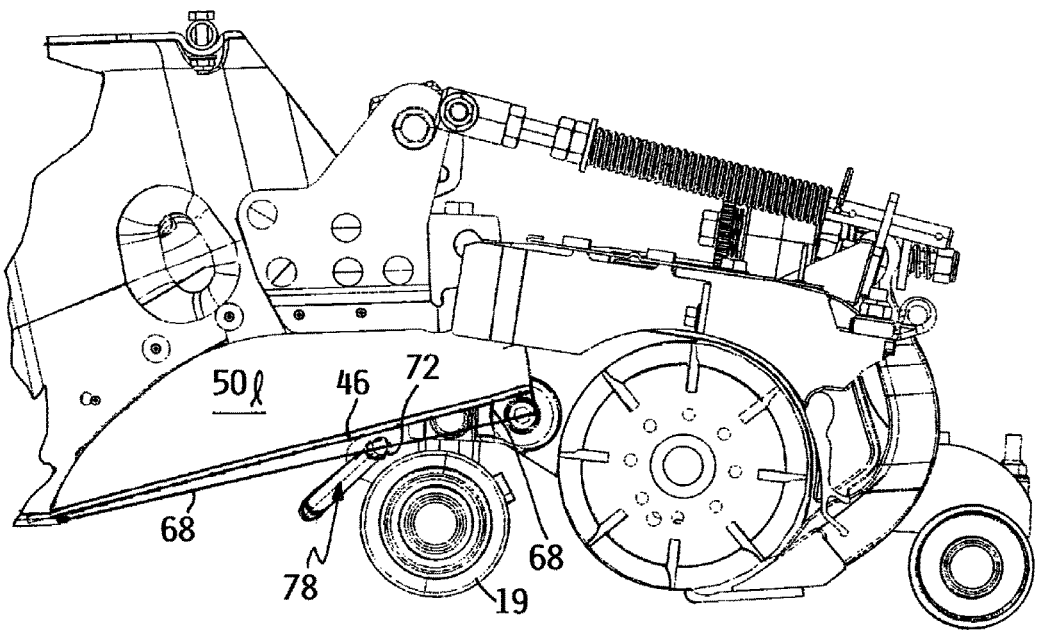
FIG. 7 is a view similar to FIG. 6, but illustrating the deflectable portion of the bottom wall of the grass basket in the deflected orientation thereof corresponding to a changed second orientation of the cutting unit and grass basket relative to one another in which the cutting unit has moved into an upwardly pitched, nose up/tail down orientation relative to the grass basket.

In allowing piece 46 to be deflected in the manner shown in FIG. 7, the material of transition sections 52 of piece 46 fold downwardly into downwardly extending folds 68 along either side of base 54. Base 54 maintains a substantially flat planar form due to the reinforcing effects of stiffeners 62 and 64. This forces the bending of piece 46 to occur only in transition sections 52 along either side of base 54 which creates the downwardly extending, laterally spaced folds 68 on either side of base 54. One fold 68 is shown in FIG. 7.

In addition to the above described design of basket 26, a remaining component of this invention comprises an actuator, indicated generally as 70 in FIG. 5, for automatically pushing piece 46 into its deflected orientation in response to certain changes in orientation between basket 26 and cutting unit 10 during operation of mower 2. Actuator 70 also obviously prevents direct contact between piece 46 and the rotating front roller 19 during operation of mower 2. As best shown in FIG. 5, actuator 70 comprises a cross bar 72 that extends laterally across cutting unit 10 above a front upper quadrant of front roller 19. Opposite ends of cross bar 72 are secured to mounting brackets 74 that are fixed in place to height adjustment brackets 76 that support the ends of front roller 19 on side plates 14 of cutting unit frame 12.

As height adjustment brackets 76 are raised or lowered on side plates 14 using known screw thread adjustment rods to raise or lower front roller 19 relative to cutting unit frame 12, cross bar 72 travels up and down with height adjustment brackets maintaining its fixed position relative to front roller 19. Obviously, height adjustment of front roller 19 is normally done before or after operation of mower 2 to let the operator pick a desired height of cut. Once set, front roller 19 maintains a constant height relative to cutting unit frame 12 and cross bar 72 similarly remains in a constant fixed position on cutting unit 10.

Cross bar 72 is normally positioned to underlie but be fairly close to or slightly engage the wear surface formed by lower stiffener 62 in the non-deflected orientation of piece 46 as shown in FIG. 6. In this position, cross bar 62 has no or little influence on piece 46 and allows piece 46 to remain substantially in its non-deflected orientation. However, in certain orientation changes where cutting unit 10 shifts into a nose up/tail down orientation relative to basket 26, such as when cutting unit 10 is lifted into a transport position when mower 2 is operated in its transport mode or when cutting unit 10 is traversing over undulating or hilly terrain when mower 2 is operated in its grass cutting mode, the change in orientation causes front roller 19 and cross bar 72 to pitch up towards the underside of piece 46 until cross bar 72 engages the wear surface formed by lower stiffener 64. Continued motion of cross bar 72 then pushes up on piece 46 to deflect piece 46 into its inclined deflected position as shown in FIG. 7. Cross bar 72 includes two laterally spaced, V-shaped relief portions 78 that provide space into which folds 68 can extend to prevent the folds 68 that are formed by deflection of piece 46 from hanging up on cross bar 72.

Thus, there will be many times during operation of mower 2 when cross bar 72 will be elevated upwardly to deflect piece 46 comprising a forward portion of bottom wall 38 of basket 26 into its inclined, deflected position as shown in FIG. 7. In this position, the slope of piece 46 is dramatically steepened to urge or facilitate the movement of grass clippings that might have collected on piece 46, or that may be in the process of being deposited on piece 46, further into the interior of basket 26 towards the closed rear end 36 of basket 26. This happens automatically in response to the changes in orientation between basket 26 and cutting unit 10 that occur naturally during operation of mower 2. This happens automatically without the operator having to do anything except to drive mower 2. It will happen with sufficient frequency during operation of mower 2 so that basket 26 will be more completely filled than before without experiencing as many of the plugging occurrences that occurred with the prior art basket 26'. Accordingly, productivity will be enhanced since the operator will need to stop less frequently to empty baskets 26.

Figure 8:
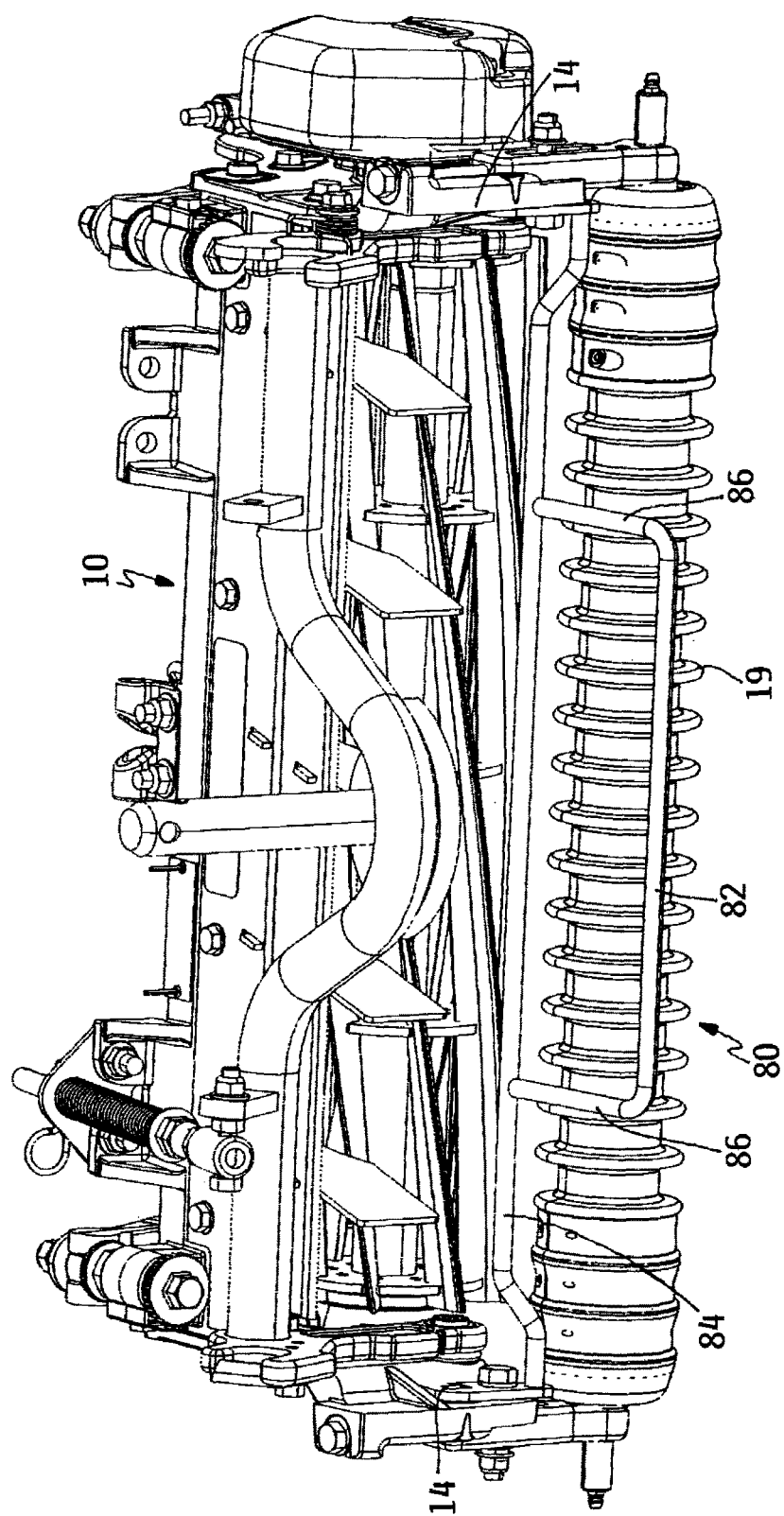
FIG. 8 is a perspective view of a reel cutting unit of the type shown in FIG. 1 equipped with an alternative second embodiment of an actuator for pushing upwardly on the deflectable portion of the bottom wall of the grass basket in response to changes in orientation between the cutting unit and the grass basket during operation of the mower.

An alternative form of actuator, identified generally as 80, for causing piece 46 to be deflected into its deflected orientation in response to changes in orientation between basket 26 and cutting unit 10 is shown in FIG. 8. Actuator 80 has a cross bar 82 that acts on the underside of piece 46 against lower stiffener 64, but cross bar 82 is set forwardly of a laterally extending rod 84. The opposite ends of rod 84 are fixedly attached, not to the height adjustment brackets of front roller 19, but more directly to side plates 14 of cutting unit frame 12. Cross bar 82 is joined to rod 84 by a pair of fore-and-aft extending legs 86 such that there are laterally extending open spaces outboard of either leg 86. Such open spaces mimic the relief portions 78 on cross bar 72 to provide space into which folds 68 can extend as piece 46 is pushed upwardly by cross bar 82 and folds 68 are formed in piece 46.

Various modifications of this invention will be apparent to those skilled in the art. For example, the term deflectable in describing motion of piece 46 into its deflected orientation is meant to encompass any type of motion that allows motion of piece 46 whether that occurs by means of a rigid pivot connection or by flexing, bending or folding of the material of which piece 46 is made. For example but not by way of limitation, piece 46 could be a rigid piece of material pivotally connected at its rear end by a hinge or pivot rod to the remaining portion 48 of bottom wall 38 with some type of seal connecting the sides of such rigid piece to side walls of the grass basket to avoid having grass clippings leak out through any openings between the sides of such rigid piece and the side walls of the grass basket that might open up during pivoting motion of the rigid piece.

In addition, actuator 70 need not necessarily push up on piece 46 to raise piece 46 into its deflected orientation, but could alternatively be linked to piece 46 in a manner that lifts or pulls upwardly on piece 46 to move piece 36 into its deflected actuator. Rather than using a rigid actuator 70, this could include, but not be limited to, the use of some type of flexible cable system as actuator 70 as long as such cable system were connected to cutting unit in a manner that automatically pulls upwardly on piece 46 in response to changes in orientation between cutting unit 10 and basket 26. Thus, the scope of protection is not to be limited to the details of the preferred embodiment disclosed herein, but shall be limited only by the appended claims.

The invention claimed is:

1. A reel mower, which comprises:
   (a) a traction frame;
   (b) a reel cutting unit operatively coupled to the traction frame; and
   (c) a grass basket operatively coupled to the cutting unit such that an open mouth of the grass basket receives grass clippings from the cutting unit, the grass basket having a deflectable portion that is moved by an actuator carried on the cutting unit from a non-deflected orientation into a deflected orientation in which the deflectable portion assists the movement of grass clippings further into an interior of the grass basket to enable more complete filling of the grass basket with grass clippings, the actuator being configured to automatically apply an actuating force to the deflectable portion to move the deflectable portion into the deflected orientation in response to changes in orientation between the grass basket and the cutting unit occurring during operation of the mower, and wherein the deflectable portion extends in a fore-and-aft direction parallel to a direction in which the clippings are thrown into the grass basket over at least approximately half of a fore-and-aft length of the grass basket.

2. The mower of claim 1, wherein the deflectable portion is part of an exterior wall of the grass basket.

3. The mower of claim 2, wherein the exterior wall is a bottom wall of the grass basket.

4. The mower of claim 3, wherein the deflectable portion has a front end, extends in the fore-and-aft direction away from the front end thereof towards a closed end of the grass basket, and terminates in a rear end that is spaced behind the front end of the deflectable portion but forwardly of the closed end of the grass basket in the fore-and-aft direction.

5. The mower of claim 4, wherein the front end of the deflectable portion comprises a lower lip of the open mouth of the grass basket.

6. The mower of claim 4, wherein the deflectable portion in the deflected orientation thereof inclines downwardly between the front and rear ends thereof as the deflectable portion extends rearwardly in the fore-and-aft direction.

7. The mower of claim 6, wherein the actuator has a portion that engages against an underside of the deflectable portion and that pushes upwardly on the deflectable portion in response to the changes in orientation between the grass basket and the cutting unit to move the deflectable portion from the non-deflected orientation to the deflected orientation thereof.

8. The mower of claim 7, wherein the actuator comprises a lateral cross bar underlying the deflectable portion of the bottom wall.

9. The mower of claim 8, wherein the cross bar has opposite ends that are fixed at either side of the cutting unit to height adjustment brackets that support opposite ends of a front roller of the cutting unit.

10. The mower of claim 8, wherein the cross bar has opposite ends that are fixed at either side of the cutting unit to side plates of a frame of the cutting unit.

11. The mower of claim 6, wherein the rear end of the deflectable portion is located in advance of the closed end of the grass basket such that a remaining portion of the bottom wall of the grass basket extends between the rear end of the deflectable portion and the closed end of the grass basket, and wherein the rear end of the deflectable portion is vertically anchored relative to the remaining portion of the bottom wall with the front end of the deflectable portion being vertically movable relative to the remaining portion of the bottom wall.

12. The mower of claim 1, further including a plurality of cutting units operatively coupled to the traction frame and a plurality of grass baskets, wherein each cutting unit has a grass basket as set forth in claim 1 operatively coupled thereto for receiving the grass clippings therefrom and carries an actuator as set forth in claim 1 for moving the deflectable portion of the grass basket operatively coupled to the cutting unit into the deflected orientation thereof.

13. The mower of claim 12, wherein the traction frame is part of a self-propelled riding vehicle.

14. The mower of claim 6, wherein the deflectable portion comprises a piece of flexible material.

15. A reel mower, which comprises:
   (a) a traction frame;
   (b) a reel cutting unit operatively coupled to the traction frame;
   (c) a grass basket operatively coupled to the cutting unit such that an open mouth of the grass basket receives grass clippings from the cutting unit, the grass basket having a deflectable portion that is moved by an actuator carried on the cutting unit from a non-deflected orientation into a deflected orientation in which the deflectable portion assists the movement of grass clippings further into an interior of the grass basket to enable more complete filling of the grass basket with grass clippings, the actuator being configured to automatically apply an actuating force to the deflectable portion to move the deflectable portion into the deflected orientation in response to changes in orientation between the grass basket and the cutting unit occurring during operation of the mower; and
   (d) wherein the deflectable portion comprises a piece of flexible material, wherein the flexible material piece is attached along opposite left and right sides thereof and along a rear end thereof to edges of a cut away portion of the grass basket to substantially fill in the cut away portion, and wherein a front end of the flexible material piece is free of attachment to any edges of the grass basket to permit up and down vertical motion of the front end of the flexible material piece.

16. The mower of claim 15, wherein the flexible material piece is shaped and sized relative to the cut away portion of the grass basket such that the left and right sides of the flexible material piece are bent vertically upwardly when they are attached to corresponding left and right edges of the cut away portion to provide the flexible material piece with a cross-sectional shape that comprises an upwardly facing, generally U-shape, and wherein the upwardly bent left and right sides of the flexible material piece comprise substantially vertical side walls of the U-shape and a remaining portion of the flexible material piece between the left and right sides thereof comprises a substantially horizontal base wall of the U-shape that is joined at opposite sides to the bent left and right sides of the flexible material piece by arcuate transition sections.

17. The mower of claim 16, wherein the base wall of the U-shape of the flexible material piece is reinforced by at least one stiffener applied to either a top side or an underside of the base wall of the channel with the stiffener extending laterally over a portion of a lateral width of the base wall but with the stiffener laterally terminating at or inside the arcuate transition sections to force the flexible material piece to fold in two laterally spaced zones that are located laterally outside of the reinforced portion of the base wall as the piece of flexible material is moved into the deflected orientation.

18. The mower of claim 17, wherein the at least one stiffener comprises a wear plate on the underside of the flexible material piece with the wear plate being positioned to be engaged by the actuator carried on the cutting unit.

19. A reel mower, which comprises:
(a) a traction frame which carries one or more reel cutting units;
(b) a grass basket associated with each cutting unit for receiving and collecting grass clippings generated by operation of the cutting unit, each grass basket having at least a forward portion of a bottom wall thereof formed by a piece of flexible material;
(c) an actuator operatively engaged with the flexible material piece for elevating a front end of the flexible material piece relative to a rear end of the flexible material piece in response to changes in orientation between the cutting unit and the grass basket during operation of the mower to thereby incline the flexible material piece to promote the flow of grass clippings down the inclined flexible material piece to more fully fill the grass basket; and
(d) wherein the bottom wall of the grass basket is generally horizontal all the way from a closed rear end of the grass basket to a front lip of the bottom wall when the flexible material piece forming the forward portion of the bottom wall has not been inclined by the actuator.

20. The mower of claim 19, wherein the actuator is fixed to the cutting unit and has a portion that is located beneath the flexible material piece to engage and push upwardly on the flexible material piece in order to elevate the front end of the flexible material piece.

21. A reel mower, which comprises:
(a) a traction frame;
(b) a reel cutting unit operatively coupled to the traction frame, the reel cutting unit having a front ground engaging roller; and
(c) a grass basket operatively coupled to the cutting unit such that an open mouth of the grass basket receives grass clippings from the cutting unit, the grass basket having a deflectable portion that is moved by an actuator carried on the cutting unit from a non-deflected orientation into a deflected orientation in which the deflectable portion assists the movement of grass clippings further into an interior of the grass basket to enable more complete filling of the grass basket with grass clippings, the actuator being configured to automatically apply an actuating force to the deflectable portion to move the deflectable portion into the deflected orientation in response to changes in orientation between the grass basket and the cutting unit occurring during operation of the mower, and wherein the actuator contacts the deflectable portion forwardly of a rotational axis of the front roller of the reel cutting unit taken with respect to a direction of forward motion of the reel cutting unit.

* * * * *